United States Patent
McCague

(10) Patent No.: US 8,273,254 B2
(45) Date of Patent: Sep. 25, 2012

(54) SPA WATER SANITIZING SYSTEM

(75) Inventor: Michael McCague, Escondido, CA (US)

(73) Assignee: Watkins Manufacturing Corporation, Vista, CA (US)

(*) Notice: Subject to any disclaimer, the term of this patent is extended or adjusted under 35 U.S.C. 154(b) by 170 days.

(21) Appl. No.: 12/763,082

(22) Filed: Apr. 19, 2010

(65) Prior Publication Data

US 2011/0253637 A1 Oct. 20, 2011

(51) Int. Cl.
*C02F 1/76* (2006.01)
*C02F 5/00* (2006.01)

(52) U.S. Cl. ............ 210/748.2; 210/754; 210/749; 210/348; 210/416.2; 210/153; 210/167.1; 210/167.11; 210/167.12; 210/167.13; 204/155; 204/156; 204/157.15; 204/193

(58) Field of Classification Search .......... 210/748.2, 210/748.01, 748.16, 748.17, 749, 764, 768, 210/767, 153, 167.01, 167.1, 167.11, 167.12, 210/167.13, 167.3, 148, 192, 754, 198.1, 210/201, 203, 252, 259, 260, 263, 287, 348, 210/416.2; 204/155, 156, 157.15, 164, 450, 204/456, 194

See application file for complete search history.

(56) References Cited

U.S. PATENT DOCUMENTS

| | | | |
|---|---|---|---|
| 4,608,247 A | 8/1986 | Heinig, Jr. | |
| 4,781,805 A | 11/1988 | Dahlgren | |
| 4,828,698 A | 5/1989 | Jewel | |
| 5,108,616 A * | 4/1992 | Kunz | 210/678 |
| 5,254,526 A * | 10/1993 | Hamilton | 504/119 |
| 5,314,589 A * | 5/1994 | Hawley | 205/618 |
| 5,326,481 A * | 7/1994 | Alwerud | 210/742 |
| 5,328,584 A | 7/1994 | Erickson et al. | |
| 5,352,369 A | 10/1994 | Heinig, Jr. | |
| 5,660,802 A | 8/1997 | Archer et al. | |
| D385,946 S | 11/1997 | Harrison et al. | |
| 5,772,896 A | 6/1998 | Denkewicz, Jr. et al. | |
| 5,779,874 A | 7/1998 | Lemke | |
| 5,779,913 A | 7/1998 | Denkewicz, Jr. et al. | |
| 5,855,777 A | 1/1999 | Bachand et al. | |
| 5,858,246 A | 1/1999 | Rafter et al. | |
| 5,900,127 A * | 5/1999 | Iida et al. | 204/290.08 |
| 6,019,893 A | 2/2000 | Denkewicz, Jr. et al. | |
| 6,165,358 A | 12/2000 | Denkewicz, Jr. et al. | |

(Continued)

FOREIGN PATENT DOCUMENTS

EP 0269261 A1 1/1988

(Continued)

OTHER PUBLICATIONS

Form PCT/ISA/210 in connection with PCT/US2010/031947 dated May 26, 2011.

(Continued)

*Primary Examiner* — Joseph Drodge
*Assistant Examiner* — Cameron J Allen
(74) *Attorney, Agent, or Firm* — Greenberg Traurig, LLP; Franklin D. Ubell

(57) ABSTRACT

A method of sanitizing water contained in a spa is provided which comprises installing a chlorine generating cell including a diamond electrode in a filter compartment of the spa, employing a resin-filled calcium remover bag to reduce the hardness of the water, adding salt to the water; and operating the chlorine generating cell to generate chlorine and other sanitizing agents for sanitizing the water.

34 Claims, 10 Drawing Sheets

U.S. PATENT DOCUMENTS

| | | |
|---|---|---|
| 6,200,487 B1 | 3/2001 | Denkewicz, Jr. et al. |
| 6,254,894 B1 | 7/2001 | Denkewicz, Jr. et al. |
| 6,627,074 B2 | 9/2003 | Lincke |
| 6,761,827 B2 | 7/2004 | Coffey |
| 6,821,398 B2 | 11/2004 | Von Broembsen |
| 6,908,541 B2 | 6/2005 | Kemner et al. |
| 6,982,040 B2 | 1/2006 | Costa et al. |
| 7,067,056 B2 | 6/2006 | Collins |
| 7,147,786 B2 | 12/2006 | Costa et al. |
| 7,208,083 B2 | 4/2007 | Meritt-Powell |
| 7,211,176 B2 | 5/2007 | Hin et al. |
| 7,238,278 B2 | 7/2007 | Coffey et al. |
| 7,320,761 B2 | 1/2008 | Costa et al. |
| 7,398,138 B2 | 7/2008 | Emery et al. |
| 2003/0094421 A1* | 5/2003 | Gargas ............ 210/760 |
| 2004/0104163 A1 | 6/2004 | Leaverton |
| 2005/0029116 A1 | 2/2005 | Bulan et al. |
| 2005/0067339 A1 | 3/2005 | McClure |
| 2006/0027463 A1* | 2/2006 | Lavelle et al. ........ 205/556 |
| 2006/0105173 A1 | 5/2006 | Seki et al. |
| 2006/0249400 A1 | 11/2006 | Bremauer |
| 2010/0101010 A1 | 4/2010 | McCague |
| 2011/0010835 A1 | 1/2011 | McCague |
| 2011/0147203 A1 | 6/2011 | Hermann et al. |

FOREIGN PATENT DOCUMENTS

| | | |
|---|---|---|
| FR | 2332342 A | 7/1977 |
| JP | 2005-123924 A | 5/1993 |
| JP | 08-001155 A | 1/1996 |
| JP | 3058508 U9 | 3/1999 |
| JP | 2005-136968 A | 5/2002 |
| JP | 2003-094050 A | 4/2003 |
| JP | 2003-190965 A | 7/2003 |
| JP | 2005-046730 A | 2/2005 |
| JP | 2008-154656 A | 7/2008 |
| KR | 10-2004-0017073 A | 2/2004 |
| WO | WO 2008056337 A1 | 5/2008 |

OTHER PUBLICATIONS

Form PCT/ISA/237 in connection with PCT/US2010/031947 dated May 26, 2011.

Form PCT/ISA/210 in connection with PCT/US2010/032102 dated Dec. 29, 2010.

Form PCT/ISA/237 in connection with PCT/US2010/032102 dated Dec. 29, 2010.

Form PCT/ISA/210 in connection with PCT/US2010/031945 dated Dec. 24, 2010.

Form PCT/ISA/237 in connection with PCT/US2010/031945 dated Dec. 24, 2010.

Form PCT/ISA/210 in connection with PCT/US2010/031948 dated Jan. 20, 2011.

Form PCT/ISA/237 in connection with PCT/US2010/031948 dated Jan. 20, 2011.

Watkins Manufacturing Corp., Hot Spring Freshwater Ag+ box, Instruction sheet, 1999, 7 pages, published in Vista California.

* cited by examiner

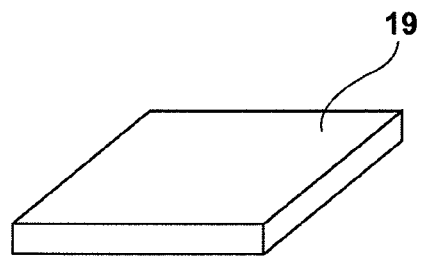
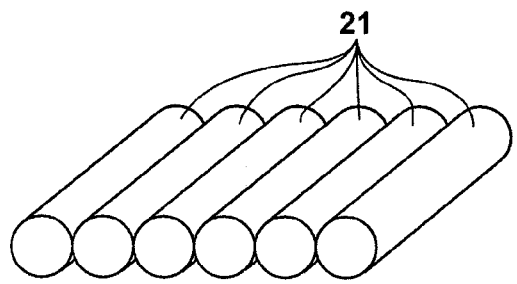
Fig. 5                    Fig. 6
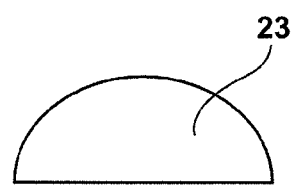
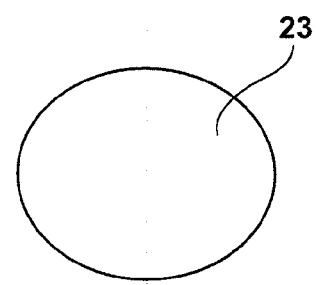
Fig. 7                    Fig. 8
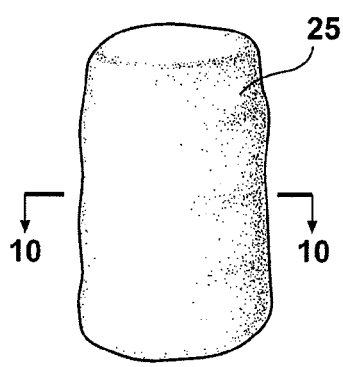
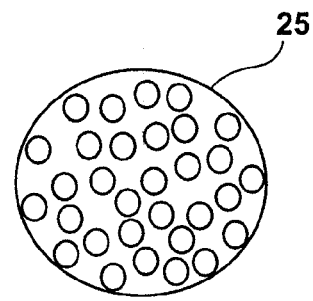
Fig. 9                    Fig. 10

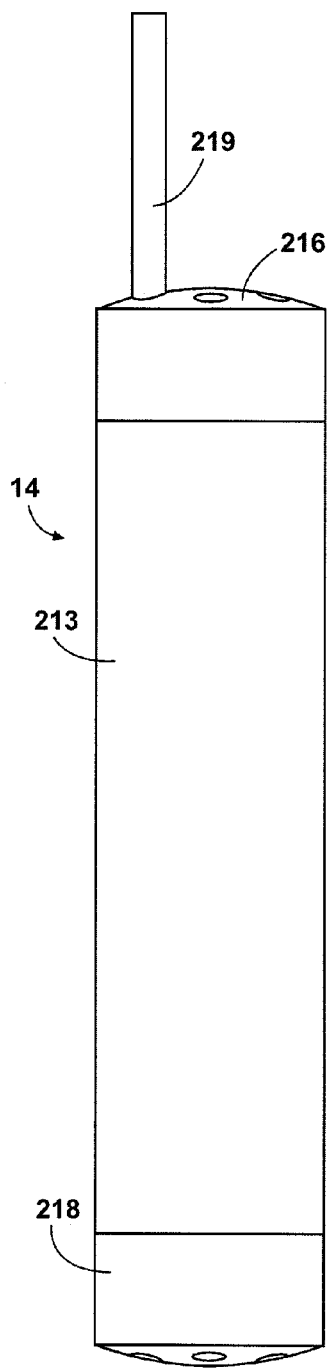
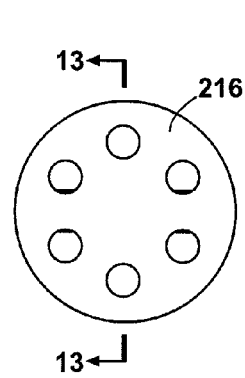
Fig. 12
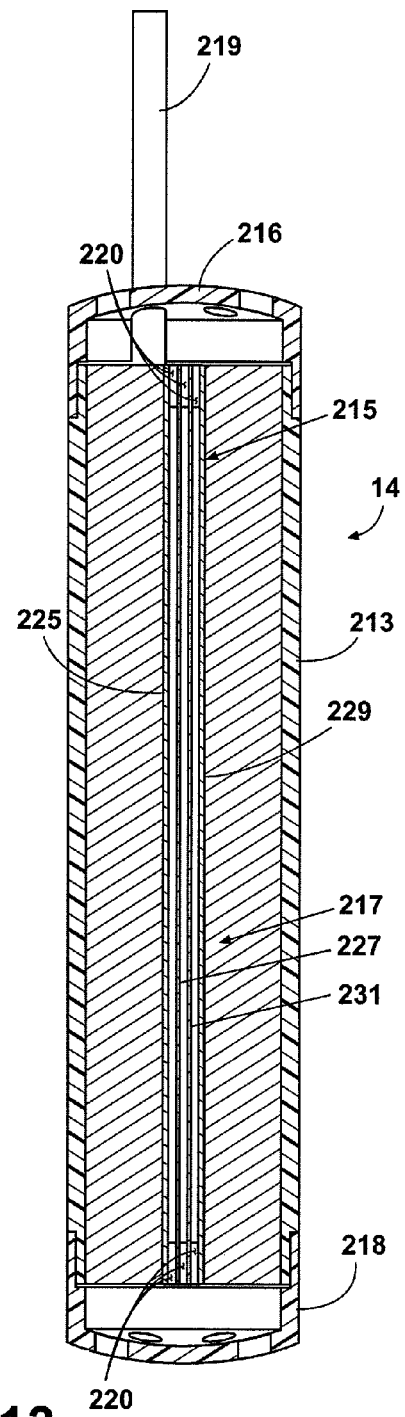
Fig. 11 Fig. 13

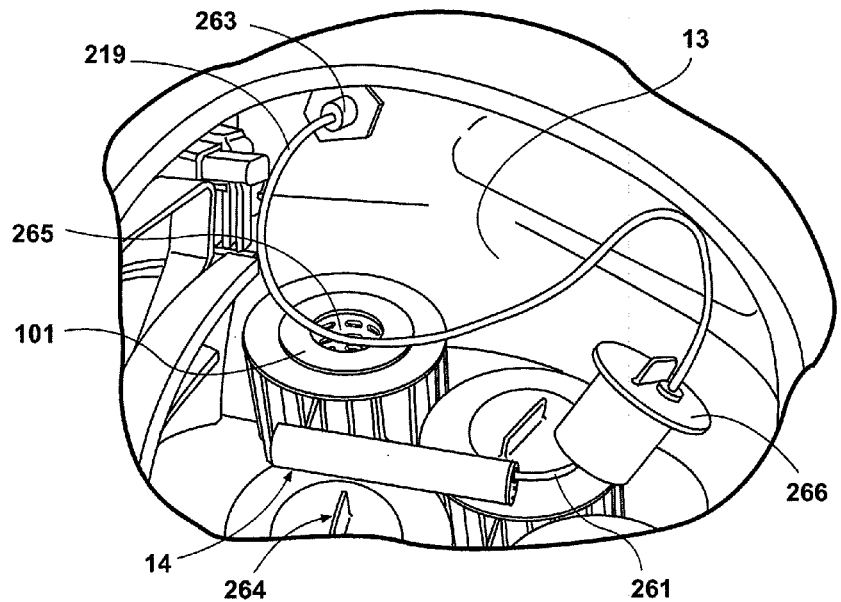
Fig. 20
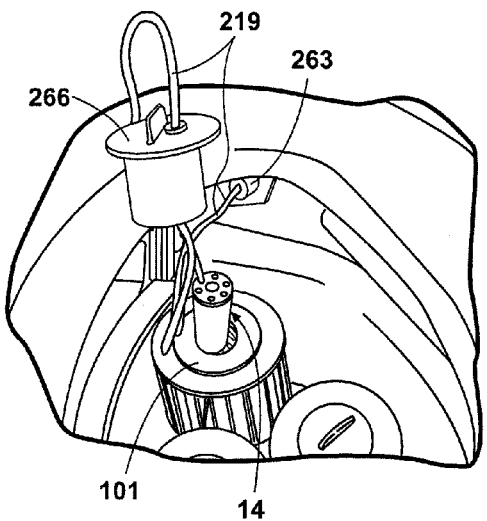 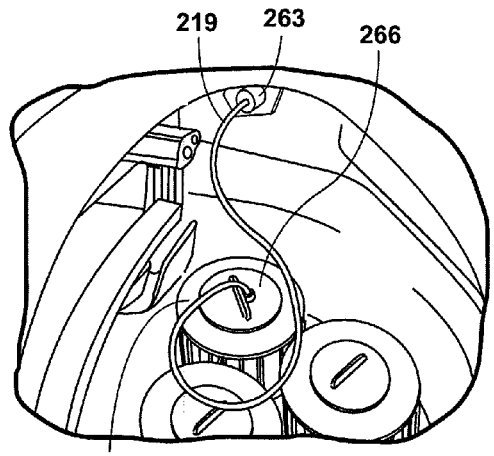
Fig. 21      Fig. 22

SPA WATER SANITIZING SYSTEM

FIELD

The subject disclosure relates to whirlpools and spas and more particularly to a sanitizing system therefor.

DESCRIPTION OF RELATED ART

Portable spas have become quite popular as a result of their ease of use and multiplicity of features such as varied jet and seating configurations. One area where the inventor has recognized that ease of use could be enhanced is the area of maintaining proper water chemistry and sanitation.

SUMMARY

The following is a summary description of illustrative embodiments of the invention. It is provided as a preface to assist those skilled in the art to more rapidly assimilate the detailed design discussion which ensues and is not intended in any way to limit the scope of the claims which are appended hereto in order to particularly point tout the invention.

According to illustrative embodiments, a method of sanitizing water contained in a spa is provided which comprises installing a chlorine generating cell in a filter compartment of the spa, employing a resin-filled calcium remover bag to reduce the hardness of the water, adding salt to the water; and operating the chlorine generating cell to generate chlorine for sanitizing the water.

In one embodiment, the chlorine generating cell includes a diamond electrode and generates other sanitizing agents in addition to chlorine. Additionally, the amount of chlorine generated may be adjusted in response to spa size and use level inputs, as well as a "boost" command. In various embodiments, water hardness is maintained in the range of 25 to 75 parts per million (ppm), the chlorine concentration is maintained at 3-5 ppm, and the salt concentration is in the range of 1,000 to 1,500 ppm.

In various embodiments, the salt water sanitizing system makes water care much easier by: (a) naturally generating hydroxyl radicals, powerful mixed oxidants like ozone, MPS non-chlorine oxidizer, and natural chlorine to keep water clear, (b) generating the right amount of sanitizer needed based on spa size and use level, parameters that are easily input through a spa control panel or remote control, (c) testing for high or low salt levels using a system salt test feature, and (d) increasing chlorine levels to meet high chlorine-demand situations as needed with a convenient Boost function.

BRIEF DESCRIPTION OF THE DRAWINGS

FIG. 5 is a perspective view of a rectangular resin-filled bag;

FIG. 6 is a schematic perspective view illustrating a baffled resin-filled bag;

FIG. 7 is a side view of a semi-spherical resin-filled bag;

FIG. 8 is a top view of the bag of FIG. 7;

FIG. 9 is a perspective view of a generally cylindrical resin-filled bag;

FIG. 10 is a sectional view taken at 10-10 of FIG. 9;

FIG. 11 is a side view of a drop-in chlorinator according to an illustrative embodiment;

FIG. 12 is a top view of the chlorinator of FIG. 1;

FIG. 13 is a sectional view of the chlorinator of FIG. 1 taken at 3-3 of FIG. 1;

FIGS. 20-22 are partial perspective views of an illustrative spa filter compartment depicting installation of a drop-in chlorinator;

DETAILED DESCRIPTION

Figure 1:
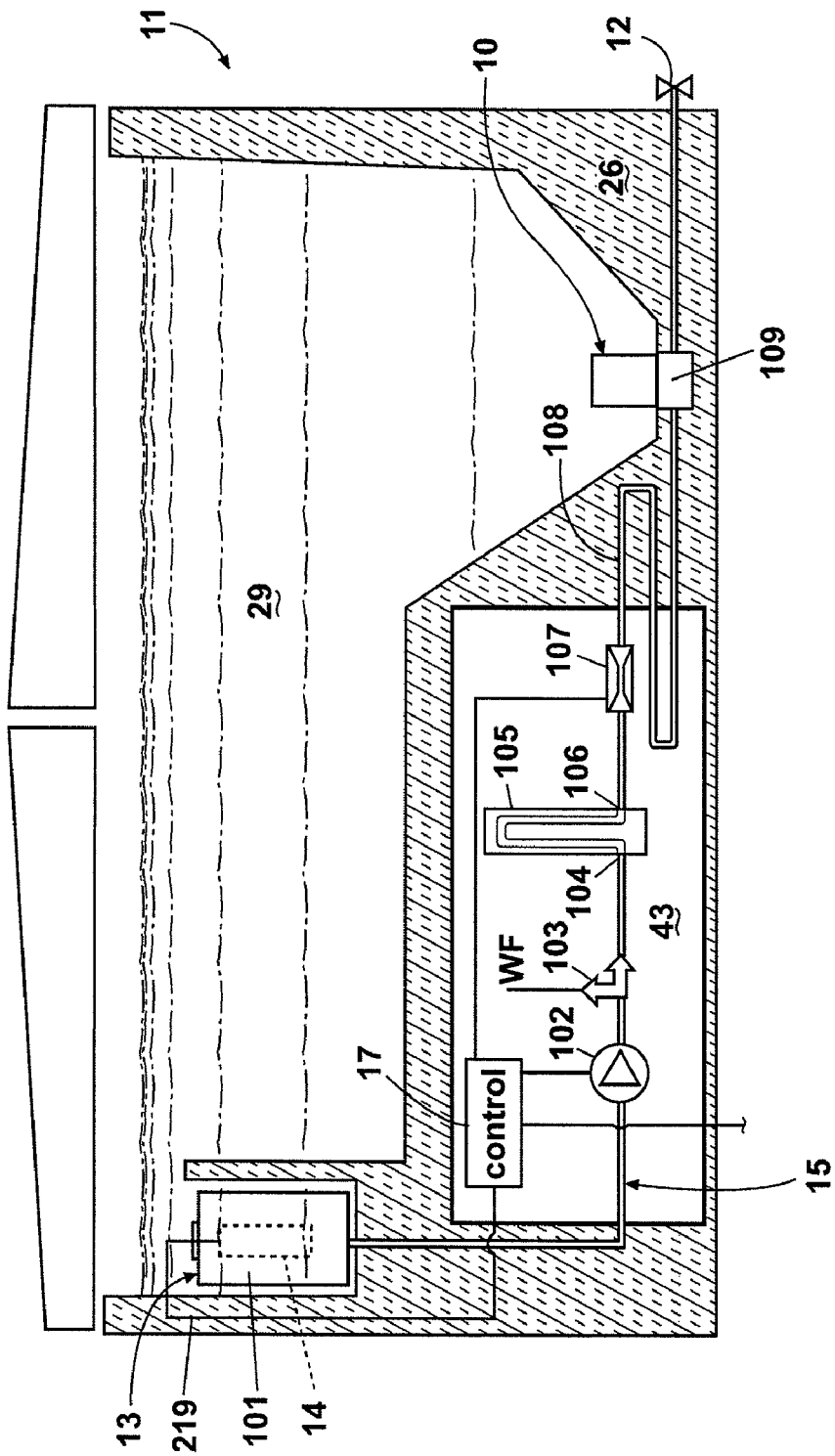
FIG. 1 is a schematic cross-sectional view of a portable spa apparatus where illustrative embodiments of the invention may find application.

FIG. 1 shows a first embodiment of a portable spa 11 arranged to implement a spa water sanitizing system according to an illustrative embodiment. The spa 11 includes a water circulation, purification and heating system which includes a filter compartment or "filter bucket" 13 containing a filter element 101. In the system of FIG. 1, spa water 29 passes through a circulation pipe 15 to a circulation pump 102 located in an equipment compartment 43 within surrounding insulation (foam) 26. A "T" junction 103 may be provided to supply water to a water feature such as a waterfall.

The circulation pump 102 further pumps the spa water through a "no fault" heater 105, with which are associated a regulating sensor 104 and a hi-limit sensor 106. An ozone generator and associated injector or other water purification apparatus 107 is also positioned in the return flow path to the spa 11, which may comprise an 8 to 10 foot contact chamber 108 and a spa inlet 109 where a circulation return jet is created. A secondary drain 12 may also be provided. An electronic control unit 17 controls the pump 102 and ozone generator 107, as well as other accessories which may be provided as part of the spa 11.

With respect to implementation of the illustrative sanitizing system embodiment, FIG. 1 illustrates placement of an ion exchange resin-filled bag 10 adjacent the circulation return jet at the spa inlet 109, as well as the placement of a drop-in chlorinator 14 within the filter element 10. In some embodiments, where spa usage is expected to be average to light, the ozone generator 107 is not needed and is disconnected. The structure and operation of various embodiments of the resin filled bag 10 and drop-in chlorinator 14 are discussed in further detail in the ensuing paragraphs, as well as U.S. patent application Ser. Nos. 12/762,496 and 12/504,491 incorporated by reference herein in their entirety.

Figure 2:
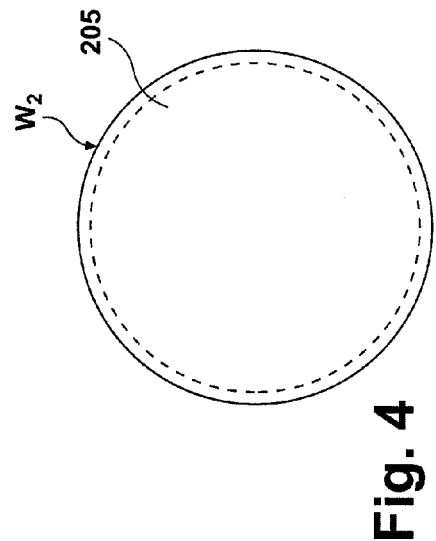
FIG. 2 is a perspective view of a cylindrical resin-filled bag.
Figure 3:
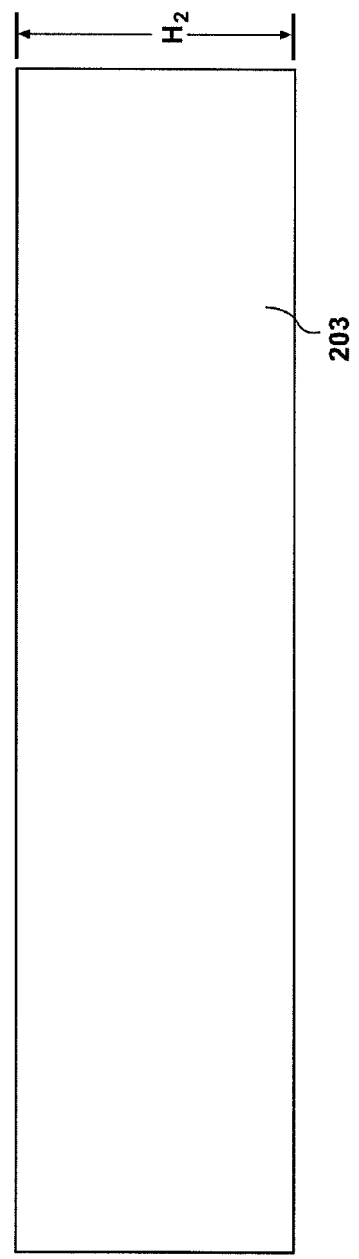
FIG. 3 is a side view of a side component of the bag of FIG. 2.
Figure 4:
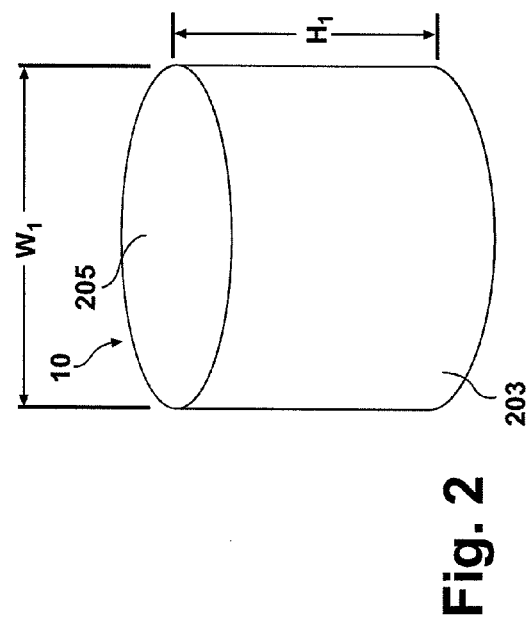
FIG. 4 is a top view of a component for forming the top and bottom of the bag of FIG. 2.

FIGS. 2-4 illustrate fabrication of one illustrative embodiment of a cylindrical resin-filled bag or sock 10, shown in an assembled state in FIG. 2. The bag 10 is generally formed by stitching together a rectangular side piece 203 (FIG. 3) and identical circular top and bottom pieces 205 (FIG. 4). In one embodiment, the top and bottom pieces 205 are sewn into place and the bag 10 is filled with resin through a side seam, which is thereafter sewn shut.

Dimensions of one illustrative embodiment of the bag 10 shown in FIGS. 2-4 are as follows in inches:

| | |
|---|---|
| Diameter W1 = 7 | Diameter W2 - 7.5 |
| Height H1 = 5.5 | Height H2 = 6.0 |

In other embodiments, the height H1 may range from 3 to 7 inches and the diameter W1 may range from 6 to 10 inches. The fabric of such an embodiment may be 200 micron pore polyester or polyethylene filter felt or automotive upholstery felt with a natural, singed, or glazed finish. In other embodiments, the porosity may range from 20 to 300 microns. Other dimensions, materials and resins may be used in alternate embodiments. The shape of the bag 10 may also be varied, such as square or a water droplet in shape, i.e., a flat bottom with a convex top.

In one embodiment the volume of the bag 10 is about 3.5 liters and is filled with about 2.75 liters of strong cation resin. Partial filling of the bag 10 accommodates swelling of the resin as it is hydrated and permits the resin to float to create a fluidized bed which increases efficiency of the ion exchange process.

In one embodiment, such a cylindrical bag 10 may be used to maintain a water hardness of 50-100 ppm in spas formed of acrylic or other materials which are not adversely affected by low levels of calcium hardness. Such a bag 10 may be placed over the heater return in a spa footwell (e.g. 109, FIG. 1), flipped over after twelve hours, and then removed after 12 more hours with the spa jets held off during the 24 hour period. Alternately, a bag 10 may be placed over a spa jet suction fitting providing sufficient suction to hold the bag 10 in place, whereafter the low speed jet pump is activated for one to three hours or until a spa water test indicates the desired 50-100 ppm level has been reached. Depending on circumstances, multiple bags/applications may be needed to achieve the target hardness using either approach.

Resin-filled bags according to various embodiments may be formed of a water permeable fabric or other material, for example, such as polypropylene, polyester, cotton, rayon, polyethylene, nylon, PTFE (Teflon), polyacrylonitrile, or acrylic. In various embodiments, the fabric type may be woven, nonwoven, felt, or mesh of a thickness of, for example, 0.01"-0.25". Illustrative porosities range from 10 micron to 500 microns.

In other embodiments, shown in FIGS. 5 and 6, a resin-filled bag 19 may be rectangular in shape with a cross section of 0.25"-2". The surface area of such a bag 19 may be divided into baffles 21 as shown in FIG. 6 to increase surface area exposure. In the embodiment of FIGS. 7 and 8, a resin-filled bag 23 is formed in the shape of a semi-sphere. FIGS. 9 and 10 illustrate a cylindrical resin-filled bag or "sock" 25.

FIGS. 11-15 depict an illustrative embodiment of a compact drop-in chlorinator 14. The chlorinator 14 has a cylindrical housing 213, which may be formed of suitable plastic or other materials. An electrode assembly 215 comprising electrodes 225, 227, 229, 231 is disposed vertically through the interior of the housing 213 and retained in the housing 213, for example, by surrounding epoxy potting compound 217. In an illustrative embodiment, epoxy 217 fills the interior of the cylinder 213 except for the space occupied by the electrode assembly. An electrical cable 219 supplies the device 14 with power and is also encapsulated by the epoxy potting compound 217. Respective end caps 216, 218 enclose the opposite ends of the housing 213 and assist in shielding the electrode assembly 215 from foreign matter, and are optional in various embodiments.

Figure 15:
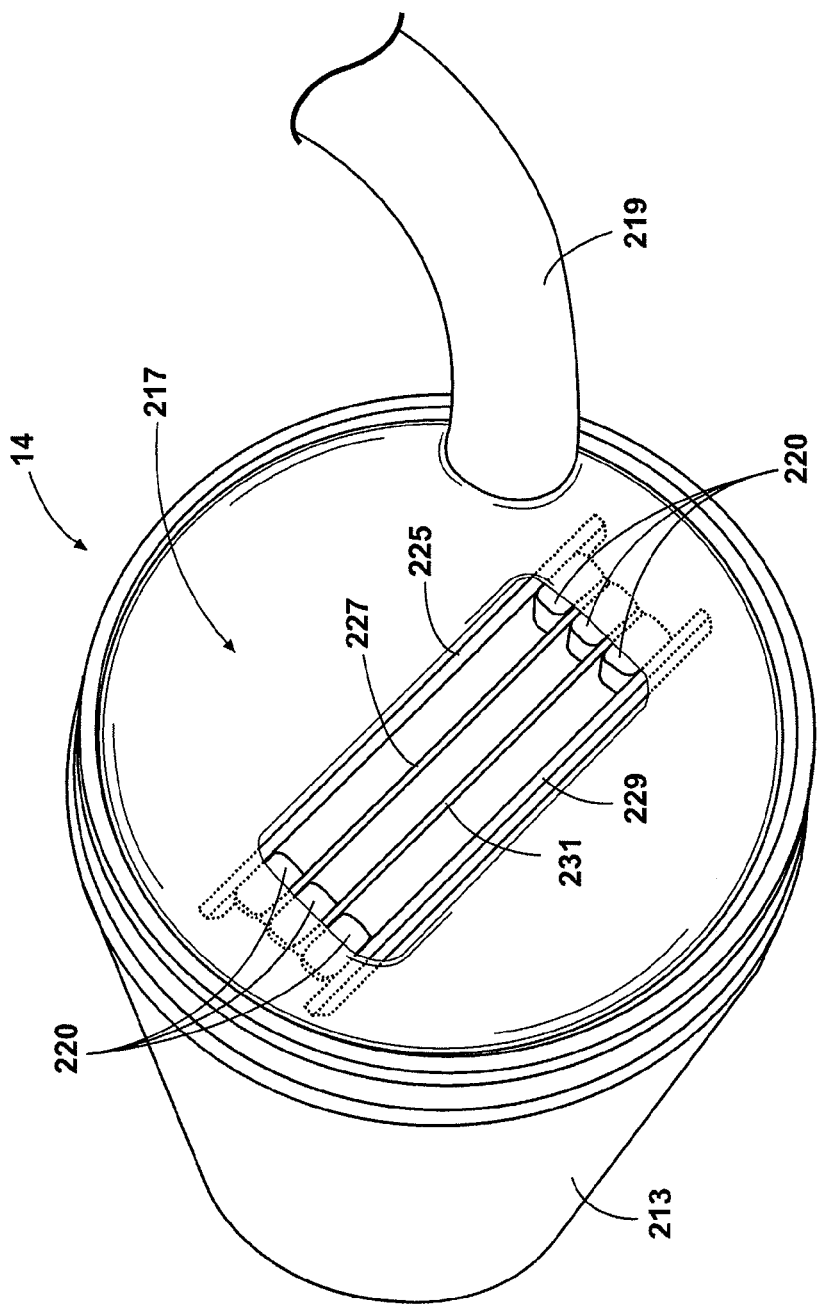
FIG. 15 is a top end perspective view of a drop-in chlorinator illustrating an electrode assembly according to FIG. 4 encapsulated in the device.

In one embodiment, spacers 220 may be used to space the electrodes apart. As seen in FIG. 15, the epoxy potting may overlap the spacers 220 and edges of the electrodes 225, 227, 229, 231 to hold the assembly 215 in position.

Figure 14:
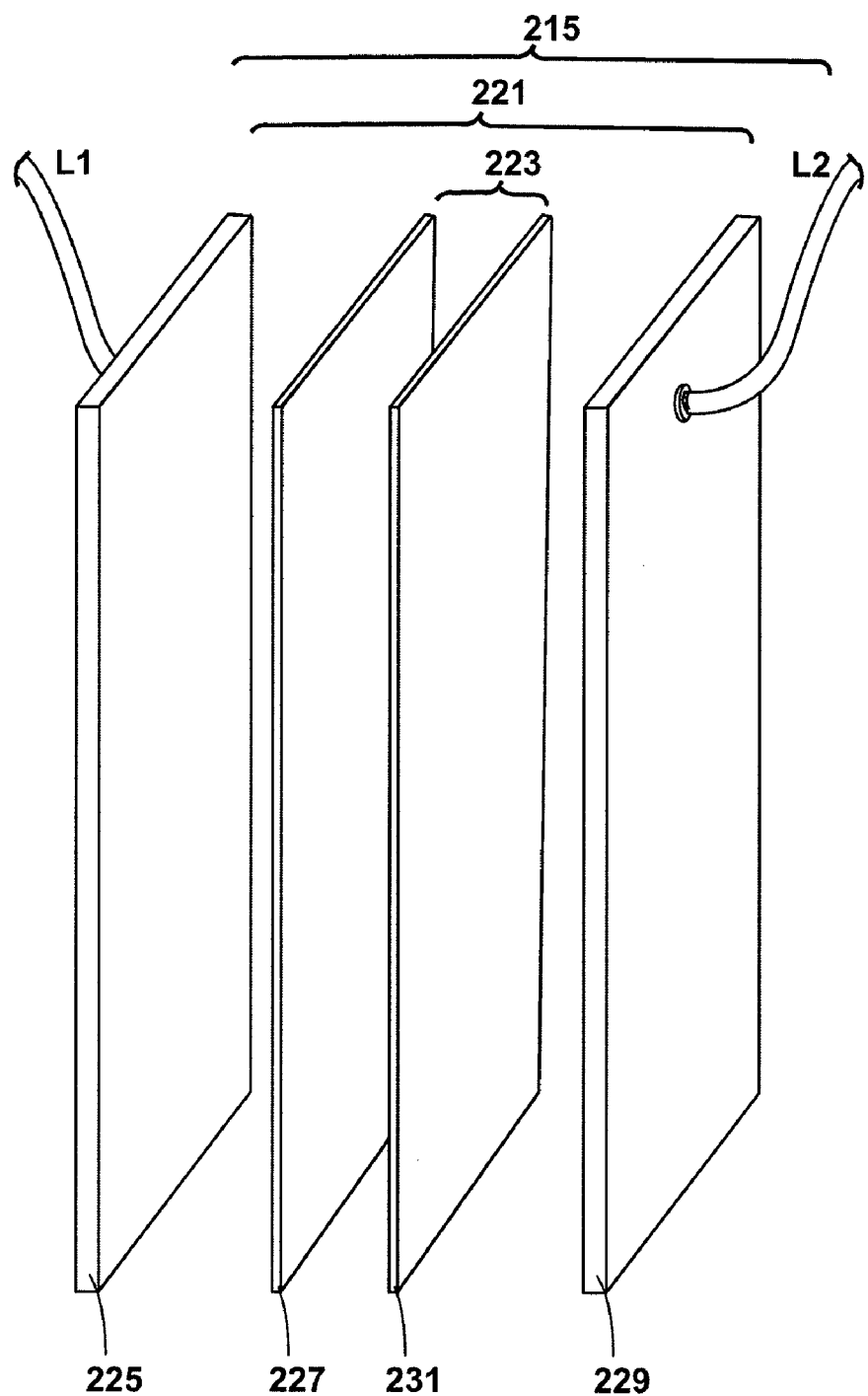
FIG. 14 is a schematic perspective view of an illustrative electrode assembly embodiment.

As illustrated in FIG. 14, the electrode assembly 215 comprises a pair of outer electrodes and a number of inner electrodes. In the illustrative embodiment of FIGS. 11-14, an outer electrode pair 221 and inner electrodes 223 are provided. In this embodiment, the outer electrode pair 221 comprises a pair of rectangular titanium electrodes 225 and 229, while the inner electrodes 223 comprise rectangular diamond electrodes 227 and 231. Electrical leads $L_1$, $L_2$ emanating from the cable 219 are welded or otherwise electrically connected to the respective titanium electrodes 225, 229. The inner electrodes 227, 231 float electrically, i.e., are not connected to ground. Additional inner electrodes, for example, up to twenty, may be provided in alternate embodiments.

In one embodiment, the titanium electrodes 225, 229 comprise titanium coated with ruthenium iridium. The diamond electrodes 227, 231 may comprise 250.0 micron boron doped diamond crystals embedded in a teflon sheet (plastic matrix) such that diamond protrudes from each side of the sheet. The plastic matrix can be polytetrafluoroethylene (PTFE), polyvinylidene fluoride (PVDF), polyethylene, polypropylene or other suitable materials. In alternate embodiments, the diamond electrodes can comprise either a coating on a substrate or whole diamond designed to be self supporting.

Figure 16:
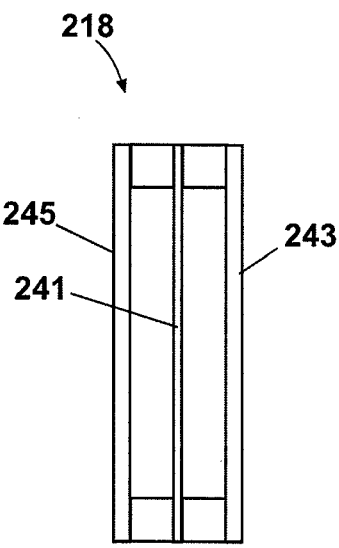
FIG. 16 is a top view of a second electrode assembly embodiment.
Figure 17:
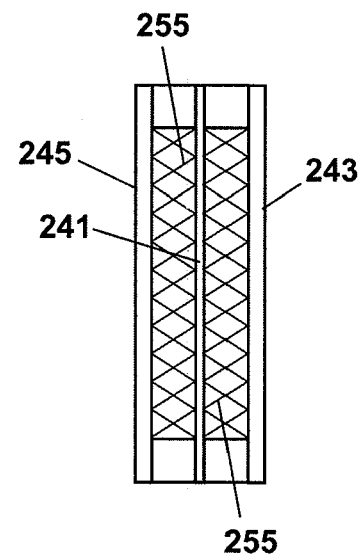
FIG. 17. is a top schematic view illustrating one implementation of the electrode assembly of FIG. 6.
Figure 18:
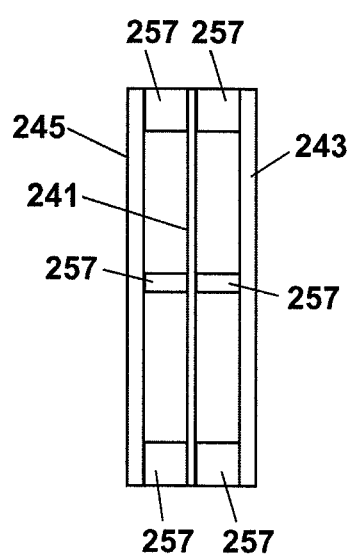
FIG. 18 is a top schematic view illustrating a second implementation of the electrode assembly of FIG. 6.
Figure 19:
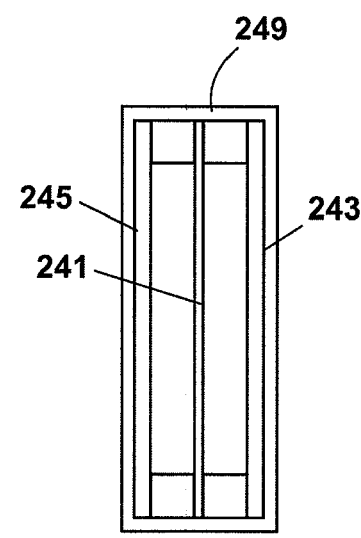
FIG. 19 illustrates one method of fabricating the assembly of FIG. 6.

In a second electrode assembly embodiment 218 shown in FIG. 16, a single central rectangular diamond electrode 241 is positioned between respective titanium outer electrodes 243, 245. In one embodiment illustrated in FIG. 19, the electrode assembly is tightly wrapped in a solid plastic film or tape 249 to keep the epoxy potting material out of the assembly 218 during fabrication. Again, the electrodes 241, 243, 245 may be separated and positioned by nonconductive, e.g. plastic mesh spacers 255 (FIG. 17) or individual plastic spacers 257 (FIG. 18). The central diamond electrode 241 floats electrically, i.e., is not connected to ground. The ends of the plate electrodes 243, 243 may be passivated, e.g., ruthenium iridium coated to avoid corrosion and calcium scale.

In various alternate embodiments, the electrodes are rectangular in shape and each comprise a boron doped synthetic diamond electrode tailored to flow rate. Such electrodes may be formed, for example, by chemical vapor deposition (CVD) of a very thin coating of boron or nitrogen doped diamond onto a niobium substrate. Such electrodes may be fabricated, for example, by Adamant, Chauxde-Fords, Switzerland, now part of Maytronics, Ltd., Israel. Other substrate materials may be used such as titanium, silicon, platinum or stainless steel. Embodiments may also be constructed of self-supporting diamond without using a substrate, such as may be obtained, for example, from Advanced Oxidation, Cornwall, U.K. In various embodiments, the substrates may either be solid plates or mesh, the latter providing increased surface area.

In such embodiments, hydroxyl radicals are generated directly off the electrode plates. The hydroxyl radicals then oxidize organic waste in the process water or react with water and dissolved salts to produce various oxidizers. These include but are not limited to, ozone (O3), hydrogen peroxide ($H_2O_2$), sodium hypochlorite (NaHOCl/OCl), chlorine dioxide (ClOC2), sodium persulfates (NaHSO5) and sodium percarbonate ($Na_2CO_3$). This broad spectrum of oxidizers is capable of neutralizing organic and other contaminants which may be present.

FIGS. 20-22 illustrate installation of a drop-in chlorinator cell 14 according to an illustrative embodiment. As may be seen the electric cable 219 enters the spa filter compartment 13 through a pass-through fitting 263 and thereafter passes through a replacement filter cap 266 from which the cell 14 is suspended. The standard filter cap, e.g. 264, is removed from the filter element 101, allowing the cell 14 to be lowered into the center or stand pipe 265 of the filter element 101. The replacement filter cap 266 is then installed (screwed-in) into the filter element central opening 265 to complete the installation, as shown in FIG. 22. A test may then be performed to ensure that the cell 14 is fully seated by operating the spa pump 102 and feeling to detect the suction of the pump 102 pulling the cell 14 in. The cell 14 is thus sized to fit down the filter pipe 265 with its outer circumference spaced from the pipe wall by, for example, 0.25 inches. In one embodiment, the cell 14 may be 1.3 inches in diameter by 6 inches in length.

Figure 23:
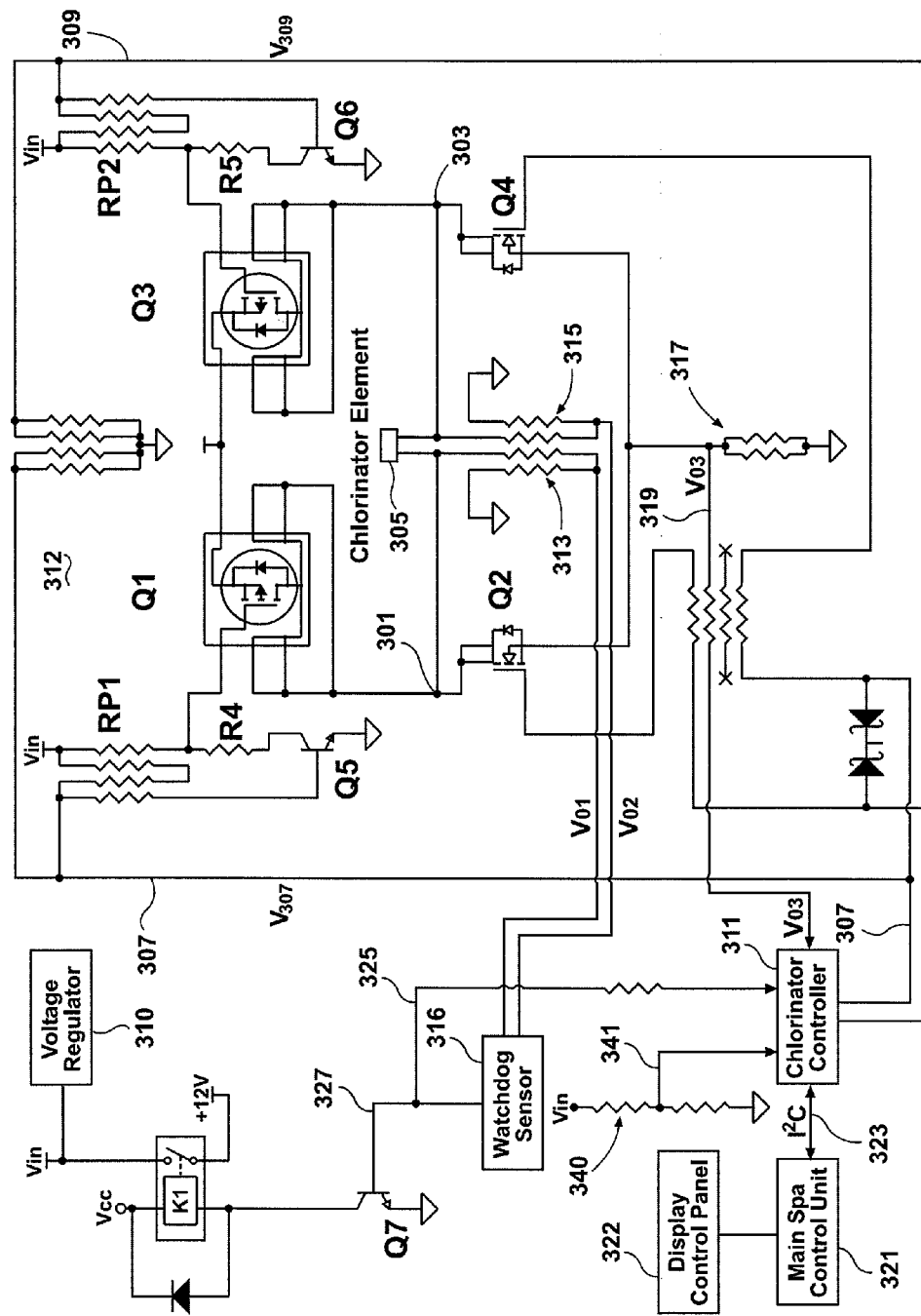
FIG. 23 is a circuit diagram of power and control apparatus of an illustrative embodiment.

Electronic apparatus for powering and controlling the chlorinator 14 is illustrated in FIG. 23. This apparatus includes the spa's main electronic control unit 321 and its associated display and control panel 322, as well as a chlorinator controller 311, a watchdog sensor 316, a voltage regulator 310, a power control relay K1 and an H Bridge drive circuit 312.

The "H" Bridge drive circuit 312 includes power MOSFET transistors $Q_1$, $Q_2$, $Q_3$, $Q_4$ and bipolar transistors $Q_5$ and $Q_6$. Respective junction points 301, 303 between the respective upper and lower transistors $Q_1$, $Q_2$, $Q_3$, $Q_4$, are connected to respective pins of a plug-in connector 305. A first of these pins connects to a first of the outer electrodes of the chlorinator 14, while a second connects to a second outer electrode of the chlorinator 14.

The drain of the MOSFET Q1 is connected the source of the MOSFET Q2 at junction 301, while the drain of the MOSFET Q3 is connected to the source of the MOSFET Q4 at junction 303. The gate of the MOSFET Q1 is connected to the junction of a resistive divider formed by resistors RP1 and R4. The other terminals of resistors RP1 and R4 are connected respectively to the power supply voltage Vin and the collector of the transistor Q5.

The gate of the MOSFET Q3 is connected to the junction of a resistive divider formed by resistors RP2 and R5. The other terminals of the resistors RP2 and R5 are connected to the power supply voltage Vin and to the collector of the transistor Q6.

One output 307 of the chlorinator controller 311 is connected to supply control signals $V_{307}$ to the base of the transistor Q5, while a second output 309 of the controller 311 is connected to supply control signals $V_{309}$ to the base of the transistor Q6. The control signals $V_{307}$ are also applied to the gate of the MOSFET Q4, while the signals $V_{309}$ are applied to the gate of the MOSFET Q2. In an illustrative embodiment, controller 311 comprises a microprocessor programmed to perform the steps described herein.

Proper generation of control signals on the signal lines 307, 309 causes D.C. power of a first polarity to be applied to the chlorinator 14 for a first time interval after which power to the chlorinator 14 is turned off for a selected interval. After that selected "off" interval, D.C. power of a polarity opposite to that of said first polarity is applied to the chlorinator 14 for a selected time interval.

To allow for monitoring of system operation, resistive dividers 313, 315 are employed to generate voltage signals $V_{O1}$ and $V_{O2}$, which are to each proportional to the voltage applied to a respective pin of the connector 305. These signals $V_{O1}$ and $V_{O2}$ are fed to a watch dog sensor circuit 316. Additionally, a resistive divider 340 permits monitoring of the input voltage $V_{in}$ by the controller 311 via a signal line 341. In one embodiment, only an undervoltage value of $V_{in}$ is tested for by controller 311.

Additionally, a current sense resistor 317 is connected to the respective drains of the MOSFETS $Q_2$ and $Q_4$ to develop a signal $V_{O3}$ proportional to the current flow through the chlorinator 14. That signal $V_{O3}$ is tapped by a signal line 319 and supplied as an input to the chlorinator controller 311.

The chlorinator controller 311 communicates with the main spa controller 321 over a bus 323. The spa controller 321 also sends and receives control signals to and from a display/control panel 322, which provides displays to the user as hereafter described and which allows the user to input commands to the spa controller 321. In illustrative embodiments, the bus 323 may be an "$I^2C$", asynchronous or other serial bus.

The watchdog sensor 316 has a control signal line 327 connected to the base of a bipolar transistor $Q_7$. The transistor $Q_7$ controls a relay $K_1$, which controls the supply of voltage $V_{in}$ to the H Bridge 312. Under certain conditions, the watchdog sensor 316 may open the relay $K_1$ to turn off power to the chlorinator 14. The controller 311 may monitor the condition of the watchdog relay 316 via a signal line 325 to determine if the watchdog 316 is active. In one embodiment, the watchdog sensor 316 also comprises a microprocessor programmed to perform the steps described herein.

At start-up, the watchdog sensor 316 closes the relay $K_1$, and arms the system unconditionally. With respect to voltages $V_{O1}$ and $V_{O2}$, the watch dog sensor 316 monitors these voltages and, if they differ from what they should be, the relay $K_1$ is opened to shut power off. In one embodiment, the sensor 316 opens $K_1$ if the D.C. voltage $V_{O1}$ or $V_{O2}$ is locked up in an active mode (one side "hot" and the other ground) for longer than a preset time.

Current is monitored by the controller 311 for short circuit conditions, and, if one occurs, the controller 311 shuts off the $Q_1$, $Q_2$, $Q_5$, $Q_6$ H Bridge circuit. Salt level is further determined from the current sense voltage $V_{O3}$ by comparing the measured current to a calibration table. In one embodiment, the salt level may either be "low," "o.k.," or "high." In one embodiment, less than 0.3 amps indicates "low," greater than 0.9 amps indicates "high" and between 0.3 and 0.9 amps is "o.k." A low current condition means increased resistance in the cell 14, which may indicate degradation in metal properties and/or need for cell cleaning.

In one embodiment, the chlorinator controller 311 causes the cell 14 to run for four cycles per day. In each cycle, the cell is sequenced to run at one voltage polarity (e.g. +12 volts) for 30 minutes, then off for one minute, and then on for another 30 minutes at the voltage of opposite polarity (e.g. −12 volts). The sequence may thereafter be repeated each cycle in order to generate the required amount of sanitizing agents as determined by user size and use inputs to the main controller 17.

A "boost command" provided to the spa control unit 321 by a user overrides the use/size based settings and causes the cell 14 to run for twenty three hours straight on the 30 minute "on"-one minute "off"-30 minute "on" sequence noted above.

Figure 24:
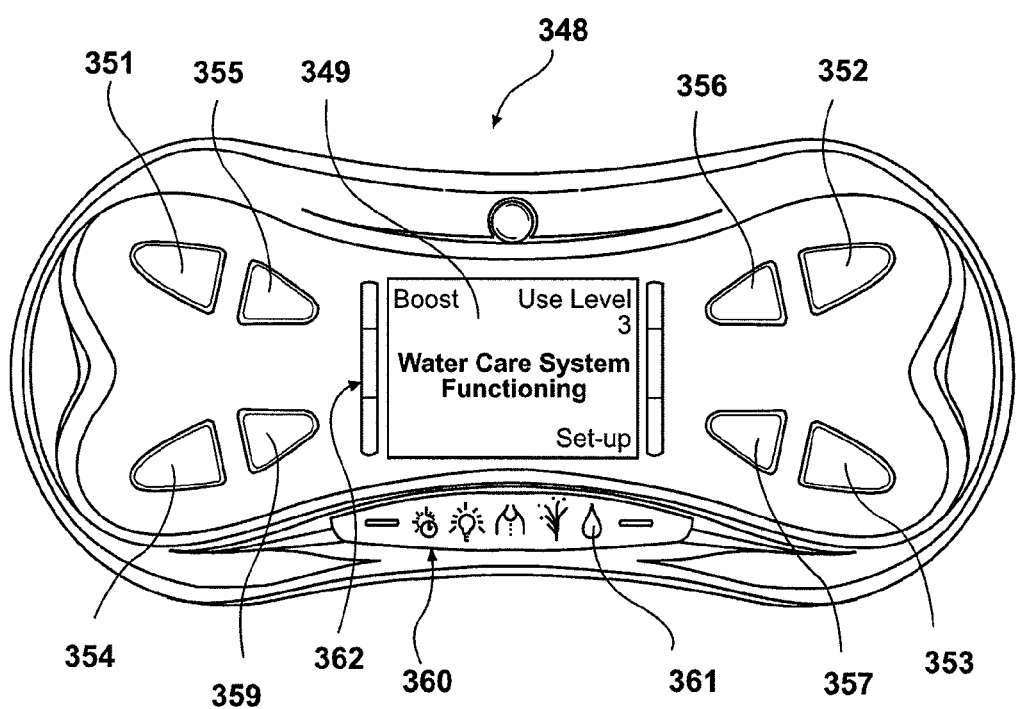
FIG. 24 is a front view of a spa control panel.

An illustrative embodiment of a control panel 348 including a display screen 349 is shown in FIG. 24. The panel includes four outer "hard" control buttons 351, 352, 353, 354 and four inner "soft" buttons 355, 356, 357, 359. In one embodiment, the four outer control buttons 351, 352, 353, 354 comprise, respectively, a spa jets control button, a lights control button, a "back" button, and an "options" button. Each soft control button 351, 352, 353, 354 effects changes depicted visually in an area of the display screen 349 adjacent the particular soft control button. An icon bar 360 is located below the display screen 349 and includes a water care icon 361 which is illuminated once the salt water sanitizing system is installed. The icon flashes when the system requires attention. FIG. 24 illustrates a screen display on the display panel 349 after the "options" button 354 has been depressed and "Water Care" has been selected from one of the options displayed by depressing the appropriate "soft button".

To implement the water care system in an illustrative embodiment, the spa is first filled with water, preferably using a pre-filter. Once the spa is filled, test strips are used to measure the pH, Total Alkalinity, and Hardness. Table I below may be used to determine if the spa water is in the "OK" range.

TABLE I

| Salt | 1000 ppm | 750 ppm | 1500 ppm |
|---|---|---|---|
| Hardness | 50 ppm | 25 ppm | 75 ppm |
| Alkalinity | 80 ppm | 40 ppm | 120 ppm |
| pH | 7.4 | 7 | 7.6 |
| Chlorine | 3 ppm | 3 ppm | 5 ppm |

The pH, and Total Alkalinity must be in the "OK" range as indicated in the table above before starting the system.

Next, a calcium remover resin bag 10 is used to reduce the Hardness level of the water if necessary. The calcium remover 10 is placed over the heater return 109 at the bottom of the spa for up to 24 hours and is flipped and repositioned over the heater return 109 after 12 hours. The system start-up procedure can begin while the calcium remover 10 is in the spa working to decrease hardness. It is important that the hardness level is in an "OK" range of 25-75 ppm ("parts per million") to ensure effectiveness of the system. Additional calcium removers 10 can be used if necessary to achieve the desired hardness.

At this point the spa has balanced water, new or properly cleaned filters, and power. In one embodiment, a water care icon 361 on the spa's main control panel display 349 is flashing, indicating that action is required. The next step in the illustrative start up procedure is to add salt.

With the spa jets running, the directed amount of salt for a particular spa model is slowly added to the spa filter compartment 13, one cup at a time, until all salt is added. The spa jets are run an additional 5 minutes to ensure salt is totally dissolved. After adding the salt at start-up, the water care icon may continue to flash and the display may read "Low Salt" if the water temperature is low. Twenty four hours should be allowed for the spa to come to temperature (100-104 F.) before retesting or adding salt.

Examples of the amount of salt required for various spa models made by Watkins Manufacturing Corporation of Vista, Calif., are shown in the following table:

SPA MODEL TABLE

| spa Model | salt (cups) or | (grams) | spa size Value | Estimated Increase in ppm |
|---|---|---|---|---|
| Vista ®/Summit* | 6 | 1735 | 8 | 170 ppm |
| Grandee ® | 6 | 1735 | 8 | 170 ppm |
| Envoy ® | 5.75 | 1630 | 7 | 170 ppm |
| Aria ® | 4.75 | 1410 | 6 | 210 ppm |
| Vanguard ® | 5.25 | 1500 | 6 | 190 ppm |
| Sovereign ® | 4.5 | 1360 | 6 | 220 ppm |
| Prodigy ® | 4.25 | 1225 | 5 | 235 ppm |
| Jetsetter ® | 2.75 | 820 | 3 | 360 ppm |

Note that the fill water may require slightly more or less salt than what is recommended Table.

In one embodiment, use levels and spa size are entered in at the spa control panel 348 after the appropriate salt level has been established. On the main control panel 348, the Options hard button 354 is pressed and thereafter a "Water Care" soft button is pressed, causing a water care system menu to appear, as illustrated in FIG. 25. The Use Level is then selected by pressing the Use Level soft button 356 in the Water Care System menu.

In one embodiment, the Use Level setting is selected using up/down arrows positioned by the soft buttons. The following are approximate guidelines for determining Use Level in one embodiment.

1=Low bather load (1 person less than 1 hour per week, vacation mode).

2-4=Normal bather load (1-2 persons less than 3 hours per week).

5=High bather load (2 or more persons more than 3 hours per week).

In one embodiment, adjusting the Use Level causes the Use Level value on the screen to flash. Once the correct Use Level is displayed, a "Confirm?" soft button is depressed to enter the new selection. The "value" then stops flashing, and the "?" next to the word "Confirm" disappears. Thereafter, pressing the "BACK" hard button 353 causes the system to return to the main menu.

In case of uncertainty as to Use Level at start-up, an initial Use Level of "3" may be selected. Regularly testing the water during the first weeks after start-up will assist in determining the correct Use Level setting. The spa water may be tested weekly following initial start-up of the system, and the Use Level adjusted "up" if the chlorine level is low, or "down" if the chlorine level is high, in order to determine the level that produces a stable chlorine level of 3-5 ppm, which will assist in maintaining water quality. A period of time such as 24 hours should be allowed for a change in Use Level to register in the chlorine reading on a test strip.

After the spa Use Level is set, the next step is to determine the Spa Size value (1-8) associated with the particular spa model using a Spa Model Table such as illustrated above. In the illustrated display/control system embodiment, the "set-up" soft button 357 is depressed on the water care system menu and thereafter a "Spa Size" soft button is pressed. Spa Size is thereafter selected using the soft buttons next to up/down arrows which appear on the menu. Adjusting the Spa Size causes the size value on the screen 349 to flash. Once the correct Spa Size is displayed, the "Confirm?" soft button is depressed to enter the selection. The "value" selected thereafter stops flashing, and the "?" next to the word "Confirm" disappears. The BACK hard button 353 is thereafter pressed to return to the main menu. This completes programming of the spa in the illustrative embodiment.

Once the spa is programmed, the chlorine level may be checked with a test strip. Depending on the spa model and water quality, it will take approximately 24 hours in one embodiment for the system to generate enough sanitizer to establish a chlorine residual of 3-5 ppm. Granular sodium dichlor may be added as directed on the bottle to bring the spa water to 5 ppm as described, to create a sanitized residual until the system is generating sanitizer at full capacity. In one embodiment the spa jets are allowed to run 5 minutes per jet system (rotating the diverter valves) while dichlor is being added. One should insure that the calcium remover 10 is repositioned if necessary after running jets The calcium remover 10 is removed after 24 hours and may be discarded in normal trash. Using a new test strip, the spa water is again tested for Hardness. If the Hardness level still reads above the recommend range of 25-75 ppm, additional calcium removers 10 are needed since the spa should not be used until the chlorine is between 3-5 ppm. After start-up, the spa water should be checked at least once every 30 days, for example, using procedures discussed above. As a reminder, in the illustrative embodiment, the water care icon flashes a status message reading, "Monthly Maintenance" at the end of each 30-day cycle.

If the spa is being used more often than usual, it may be necessary to add more chlorine to the water by "boosting" the system. To increase the chlorine level the Water Care system menu is accessed by pressing the Options hard button 354, followed by the "Water Care" soft button on the spa's main control panel. Next, a "Boost" soft button is pressed, and a "Yes" soft button thereafter pressed to confirm the manual Boost operation. In one embodiment, the system automatically initiates a salt test before the Boost. Once the salt test is complete, the status displays "Water Care System Boosting" when active. In one embodiment, it takes 24 hours to complete the Boost cycle. Sodium dichlor may be added if necessary for regular use or shocking the spa.

In one embodiment, the system automatically tests the water's salt level, as discussed above. A manual Salt Test is only required if the water care icon 361 is flashing and the status screen 349 indicates "High salt" or "Low salt" levels. To conduct a manual Salt Test in one embodiment, the Water Care system menu is accessed by pressing the Options hard button 354, followed by the "Water Care" soft button, on the spa's main control panel. Next, the "set-up" soft button 357 is depressed, followed by a "salt test" soft button.

In one embodiment, a red/green/yellow salt level bar 362 on the left side of the screen then displays a black line, which indicates the salt level of the water. A green portion of the bar represents the OK range for salt, a red portion means high salt, and a yellow portion means low salt.

After depressing the "salt test" soft button, the "Yes" soft button is depressed to start the salt test and 20 seconds is allowed to elapse for the test to complete. A Salt Test should not be performed while the jets are running. If proper amount of salt is present, the screen will display "Water Care system Functioning", as shown in FIG. 25.

If "Low salt" or "High salt" is still displayed, the following steps may be taken:

For Low Salt—

If the cell is new, or has just been cleaned, location of the salt indicator is reviewed to determine how low the salt level is. Then (1) cup of salt is added to the water and circulated for 5 minutes and thereafter a second salt test is performed.

If the proper amount of salt is present, the screen will display "Water Care system Functioning". If the screen still displays Low Salt, repeat the process as needed. If 50% of the spa's recommended salt has been added and the icon continues to flash, professional assistance may be required. A Low Salt reading may also indicate the need to clean the cell 14.

For High Salt—

The location of the salt indicator is reviewed to determine how high the salt level is. If the salt indicator is half way or less up the red part of the salt level bar, 25% of the water is drained from the spa, which is then and refilled with clean, clear water. If the salt indicator is more than half way up the red part of the salt level bar, the spa is drain completely and refilled following the Start-up and Refill Procedure. Thereafter, jet pumps are run for 5 minutes, and another manual Salt Test conducted. If the proper amount of salt is present, the screen 349 will display "Water Care system Functioning". If the screen 349 still displays High Salt, the above steps are repeated as needed. The salt level reading can be affected by cell age, scale build-up, water temperature, dirty filters, or dirty water. A salt test strip can be used to manually verify the system's salt level reading.

Periodic cleaning of the cell 14 with a mild acid solution is recommended to maximize the life of the equipment. Use of the calcium remover 10 helps reduce the cleaning frequency. On average, the cell 14 should be cleaned every 3 months. When the status message on the screen indicates Low Salt and the water has not been changed or topped off recently, it may be time to clean the cell.

Because the salt water sanitizing system reduces the amount of chemicals added to the spa water, it is possible to significantly extend the life of the water. Water should be tested regularly to ensure safety. The system of the illustrative embodiments works best with low levels of calcium and minerals in the water. Softened water also prolongs the life of hot tub equipment, while enhancing the soaking experience. The ideal hardness level when using the system is 50 ppm.

Those skilled in the art will appreciate from the foregoing that various adaptations and modifications of the just described embodiments can be configured without departing from the scope and sprit of the invention. Therefore, it is to be understood that, within the scope of the appended claims, the invention may be practiced other than as specifically described herein.

What is claimed is:

1. A method of sanitizing water contained in a spa comprising:
    installing a chlorine generating cell in a filter compartment of the spa;
    employing a resin-filled calcium remover bag to reduce the hardness of the water;
    adding salt to the water; and
    operating the chlorine generating cell to generate chlorine for sanitizing the water.

2. The method of claim 1 wherein said chlorine generating cell generates one or more sanitizing agents in addition to chlorine.

3. The method of claim 2 wherein said chlorine generating cell employs at least one diamond electrode.

4. The method of claim 1 further comprising employing a degree-of-use level input to adjust the amount of chlorine present in said spa water.

5. The method of claim 1 further comprising employing a spa size input to adjust the amount of chlorine present in the water.

6. The method of claim 4 further comprising employing a spa size input to adjust the amount of chlorine present in the water.

7. The method of claim 1 further comprising employing a "boost" command to adjust the amount of chlorine present in the water.

8. The method of claim 6 further comprising employing a "boost" command to adjust the amount of chlorine present in the water.

9. The method of claim 1 wherein the desired water hardness is in the range of 25 to 75 parts per million (ppm).

10. The method of claim 1 wherein the desired chlorine concentration is 3-5 ppm.

11. The method of claim 1 wherein the desired salt concentration is in the range of 1,000 to 1,500 ppm.

12. The method of claim 9 wherein the desired spa salt concentration is in the range of 1,000 to 1,500 ppm.

13. The method of claim 10 wherein the desired spa salt concentration is in the range of 1,000 to 1,500 ppm.

14. The method of claim 1 wherein the step of employing the resin-filled calcium remover bag comprises placing said bag in the spa water.

15. The method of claim 1 wherein the step of employing the resin-filled calcium remover bag comprises placing the resin-filled remover bag in the spa water adjacent a circulation return jet of the spa.

16. The method of claim 1 wherein the step of employing the resin-filled calcium remover bag comprises placing the resin-filled remover bag in the spa water adjacent a spa jet suction fitting.

17. The method of claim 15 wherein the step of installing further comprises positioning the chlorine generating cell in a central opening of a filter element disposed in said filter compartment.

18. The method of claim 14 wherein the step of installing further comprises positioning the chlorine generating cell in a central opening of a filter element disposed in said filter compartment.

19. The method of claim 1 further comprising pumping the spa water using a pump such that it passes first through the chlorine generating cell then to the pump and thereafter to an ozonator.

20. The method of claim 17 further comprising pumping the spa water using a pump such that it passes first through the chlorine generating cell then to the pump and thereafter to an ozonator.

21. The method of claim 14 wherein the calcium remover bag is removed from the spa water after 24 hours or less and the water is then tested to determine whether the water hardness level is above a recommended range.

22. The method of claim 21 wherein said range is 25 to 75 parts per million (ppm).

23. Apparatus comprising:
a spa or tub containing water; and
apparatus for sanitizing the water comprising:
an electrolytic sanitizing agent generating cell located in a filter compartment of the spa and connected to an electric cable passing through a wall of the spa;
a calcium remover bag positionable in the spa water and configured to reduce water hardness; and
a pump operable to pull water into the filter compartment, through the sanitizing agent generating cell, then through the pump, and back into the spa.

24. The apparatus of claim 23 wherein the pump is disposed between the sanitizing agent generating cell and an ozonator and is operable to pull spa water first through the sanitizing agent generating cell to add sanitizing agents to the water and then supply the water to the ozonator.

25. The apparatus of claim 24 wherein said bag contains a quantity of chemical-removing ion exchange resin, the quantity of resin and the size of the bag being selected such that the resin-filled bag may be readily inserted by hand into a selected location within the spa to effectively remove one or more undesired chemicals from the spa water.

26. The apparatus of claim 24 wherein said bag comprises:
a cylindrical, flexible, water permeable bag having a 20-300 micron porosity, a height in the range of 3 to 7 inches and a diameter in the range of 6 to 10 inches; and
a quantity of acid cation exchange resin filling said bag, whereby the resin-filled bag may be readily inserted by hand into a selected location within a pool or spa to effectively remove one or more undesired chemicals.

27. The method of claim 1 further comprising:
allowing said bag to remain in said water until a water hardness level of 50 to 100 ppm is achieved.

28. A method of sanitizing water contained in a spa having a chlorine generating cell disposed in a filter compartment thereof comprising:
placing a resin-filled calcium remover bag in the spa water to reduce the hardness of the water;
adding salt to the water; and
operating the spa and the chlorine generating cell to draw the water through the chlorine generating cell and the calcium remover bag to thereby generate chlorine while removing calcium.

29. A method of sanitizing water contained in a spa comprising:
installing a chlorine generating cell in a filter compartment of the spa;
placing a resin-filled calcium remover bag in the spa water;
adding salt to the water; and
operating the spa and the chlorine generating cell to generate chlorine for sanitizing the water and to draw water through the chlorine generating cell and the calcium remover bag.

30. The method of claim 29 further comprising employing a degree-of-use level input to adjust the amount of chlorine present in said spa water.

31. The method of claim 29 further comprising employing a spa size input to adjust the amount of chlorine present in the water.

32. The method of claim 30 further comprising employing a spa size input to adjust the amount of chlorine present in the water.

33. The method of claim 29 further comprising employing a "boost" command to adjust the amount of chlorine present in the water.

34. The method of claim 32 further comprising employing a "boost" command to adjust the amount of chlorine present in the water.

* * * * *